United States Patent
Lyon et al.

(10) Patent No.: US 9,050,967 B1
(45) Date of Patent: Jun. 9, 2015

(54) METHODS AND SYSTEMS FOR A STOP/START ENGINE

(71) Applicant: Ford Global Technologies, LLC, Dearborn, MI (US)

(72) Inventors: Peter Mitchell Lyon, Birmingham, MI (US); Andrew Clement Dame, Saline, MI (US); Peter Douglas Kuechler, Canton, MI (US); Alan Robert Dona, Huntington Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 14/088,886

(22) Filed: Nov. 25, 2013

(51) Int. Cl.
*B60W 10/18* (2012.01)
*B60W 10/184* (2012.01)
*B60W 10/06* (2006.01)

(52) U.S. Cl.
CPC ............ *B60W 10/184* (2013.01); *B60W 10/06* (2013.01)

(58) Field of Classification Search
None
See application file for complete search history.

(56) References Cited

U.S. PATENT DOCUMENTS

| | | | |
|---|---|---|---|
| 4,192,279 A | 3/1980 | Maisch et al. | |
| 6,308,129 B1 * | 10/2001 | Uchida | 701/112 |
| 6,973,383 B2 * | 12/2005 | Mitsutani et al. | 701/112 |
| 7,558,666 B2 * | 7/2009 | DiGonis | 701/112 |
| 8,579,765 B2 * | 11/2013 | Yu et al. | 477/184 |
| 8,821,348 B2 * | 9/2014 | Yu et al. | 477/203 |
| 2011/0054765 A1 | 3/2011 | Lewis et al. | |
| 2014/0066255 A1 * | 3/2014 | Yu et al. | 477/203 |

FOREIGN PATENT DOCUMENTS

| | | | | |
|---|---|---|---|---|
| DE | 19502154 A1 | 8/1996 | | |
| EP | 1469195 A1 | 10/2004 | | |
| GB | 2494648 A | 9/2011 | | |
| WO | 2013099490 A1 * | 7/2013 | | F02D 29/02 |

* cited by examiner

*Primary Examiner* — Dirk Wright
(74) *Attorney, Agent, or Firm* — David Kelley; Alleman Hall McCoy Russell & Tuttle LLP

(57) ABSTRACT

Systems and methods for improving operation of a vehicle are presented. In one example, automatic engine stopping is inhibited in response to a driver communicating a desire to not automatically stop an engine. The driver communicates intentions to allow or inhibit automatic engine stopping via a brake pedal.

20 Claims, 5 Drawing Sheets

METHODS AND SYSTEMS FOR A STOP/START ENGINE

FIELD

The present description relates to a system and methods for improving vehicle drivability and driver controls. The systems and methods may be particularly useful for engines that may be frequently stopped and restarted to conserve fuel.

BACKGROUND AND SUMMARY

An engine of a vehicle may be automatically stopped without a driver providing input to a device that has a sole purpose or function of stopping engine rotation so that fuel may be conserved (e.g., engine stop/start devices). Fuel may be conserved when the engine is automatically stopped since the engine does not consume fuel when it is not operating. However, if the engine is restarted immediately after it is stopped, the fuel reduction may be less than desired. Further, the driver may be annoyed that the engine has stopped and is being restarted so quickly after being stopped. Thus, automatically stopping an engine may conserve fuel, but it may also be less than desirable during some driving conditions. Present implementation schemes for engine stop/start devices provide a switch for a driver override that inhibits the automatic engine stop feature. However, there may be conditions when the driver wishes to override the engine stop functionality only once, or desires to override the engine stop feature without looking away from the vehicle's route to locate and active the switch.

The inventors herein have recognized the above-mentioned disadvantages of automatic engine stopping and have developed a method for operating an engine, comprising: inhibiting automatic engine stopping in response to a secondary application or increased application of vehicle brakes following an initial application of vehicle brakes, the secondary application or increased application of vehicle brakes occurring after the initial application of vehicle brakes and without vehicle brakes being fully released.

By allowing a driver to communicate to an engine stop/start controller via application of vehicle brakes, it may be possible to reduce the possibility of aggravating the driver during conditions where the driver may have more information than the vehicle engine controller regarding whether or not conditions are desirable for automatically stopping the engine. For example, a driver of a vehicle may notice that traffic lights for opposing traffic are about to change and give right of way to the driver. The driver may apply vehicle brakes in a prescribed manner that allows the driver to communicate with the automatic engine stop controller so that automatic engine stopping is inhibited in response to the driver applying vehicle brakes. As a result, the vehicle may accelerate in a more timely manner when automatic engine stopping is inhibited, thereby improving driver satisfaction.

The present description may provide several advantages. In particular, the approach may improve driver satisfaction. Additionally, the approach may save fuel when fuel consumption may be increased by stopping and engine and restarting the engine shortly thereafter. Further, the approach may provide the driver improved vehicle control as compared to other systems where the driver cannot communicate with the engine stop controller.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
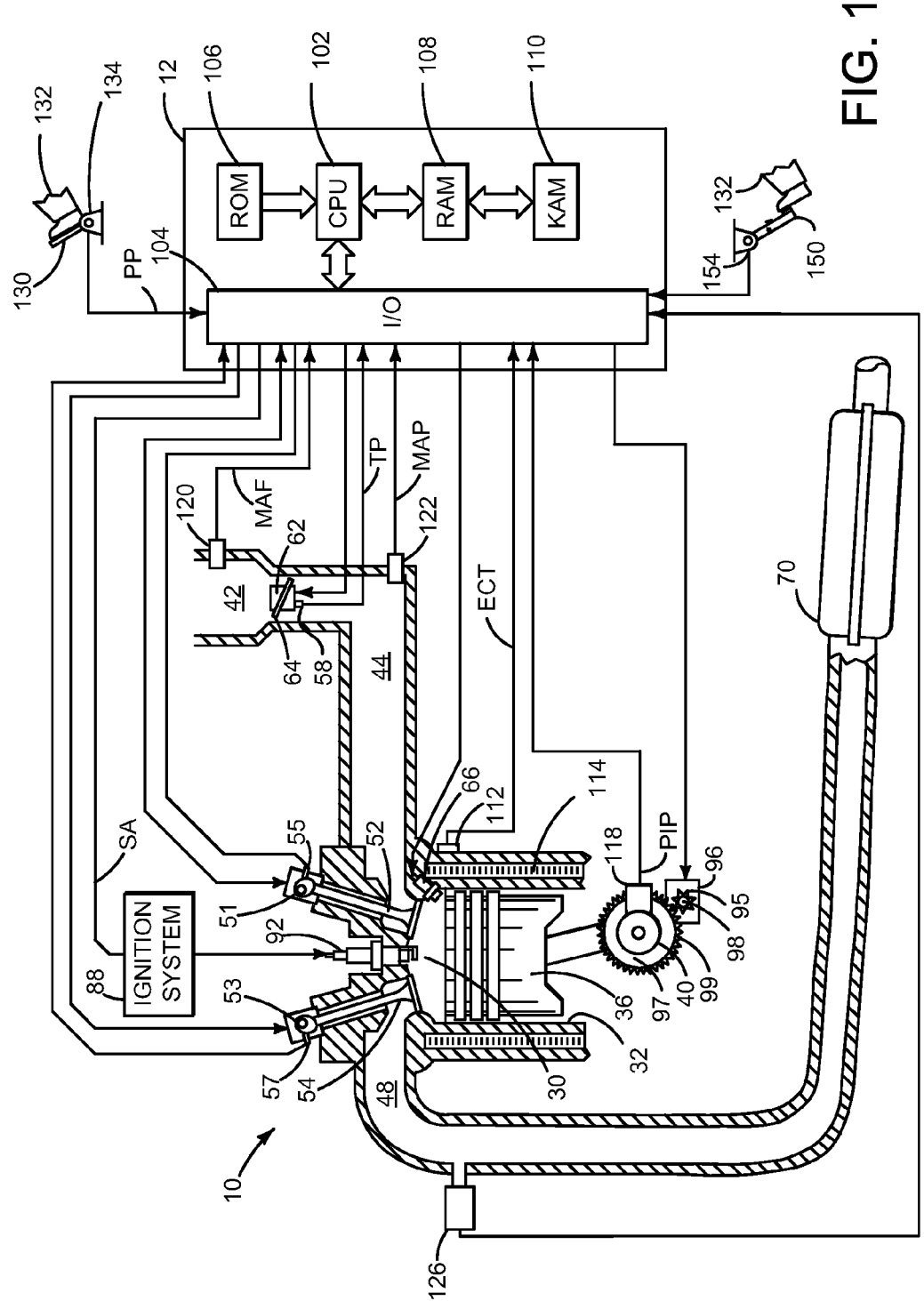
FIG. 1 is a schematic diagram of an engine.
Figure 2:
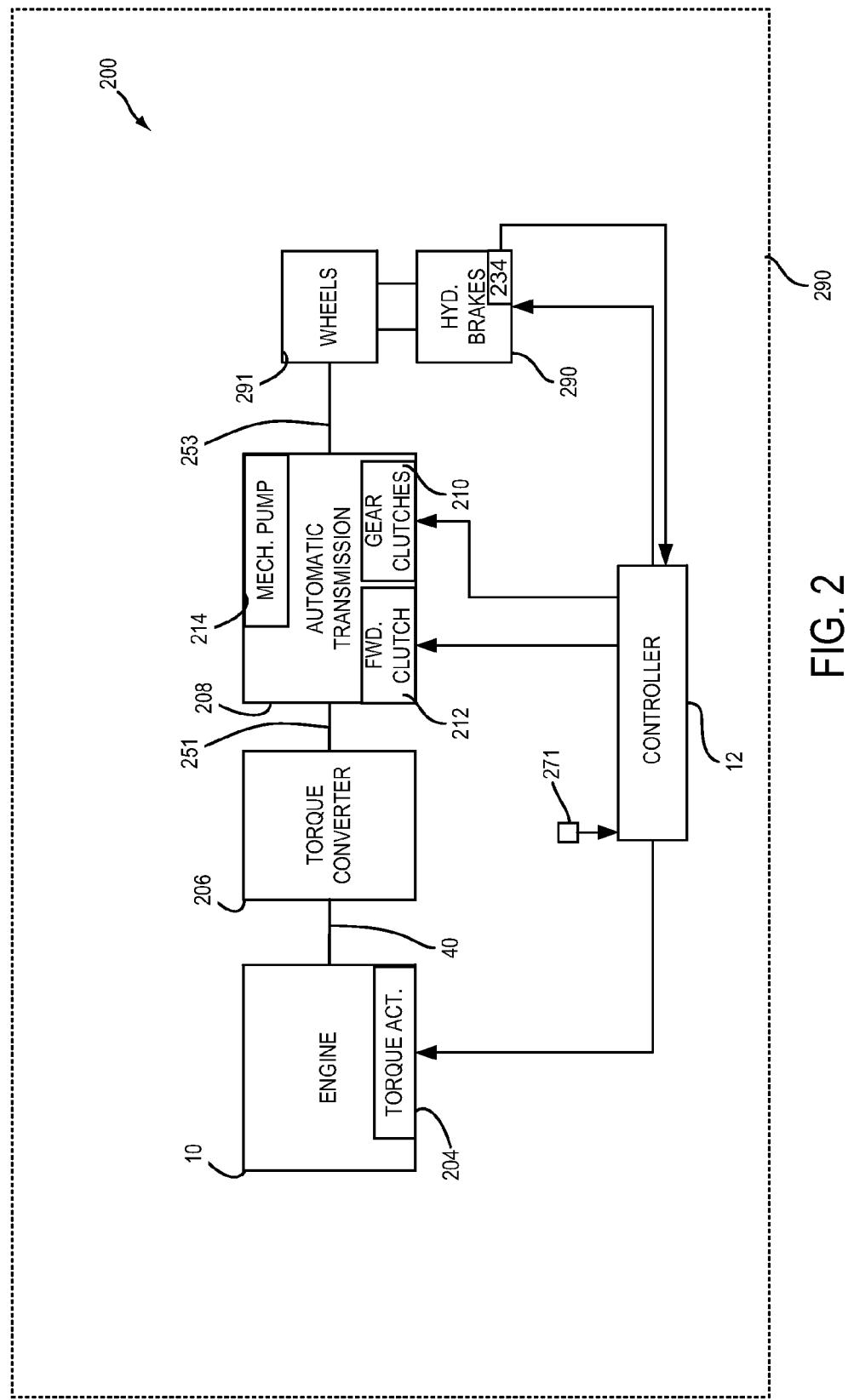
FIG. 2 shows an example vehicle driveline.

The present description is related to controlling operation of an engine that may be automatically stopped and started in a vehicle. The engine may be a sole source of torque for propelling the vehicle. Alternatively, the vehicle may include an engine and a motor that both supply torque to propel the vehicle. FIG. 1 shows an example engine system. The engine may be part of a vehicle driveline as is shown in FIG. 2. The engine may restart, automatically stop, or be prevented from being automatically stopped as shown in the engine operating sequence shown in FIG. 3. Vehicle brake system conditions illustrated in FIGS. 4 and 5 may be the basis for judging whether or not to automatically stop and/or start an engine. The method of FIG. 6 may operate an engine and driveline according to FIGS. 1 and 2 to provide the operating sequence shown in FIG. 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by driver 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; brake pedal position from brake pedal position sensor 154 when driver 132 applies brake pedal 150; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, an example vehicle driveline 200 is shown. Vehicle driveline 200 includes engine 10 as shown in greater detail in FIG. 1. Engine 10 may include one or more torque actuators 204. Torque actuator 204 may be an engine throttle, variable camshaft, fuel injector, ignition system, or other device that may affect engine torque. Engine torque may be increased or decreased via operating the torque actuator.

Engine 10 provides torque to torque converter 206 via crankshaft 40. Torque converter 306 hydraulically couples engine 10 to transmission input shaft 251. Automatic transmission 208 includes a forward clutch 212 and gear clutches 210. Mechanical pump 214 supplies pressurized transmission fluid to torque converter 206, gear clutches 210, and forward clutch 212.

Driveshaft 253 directs torque from transmission 208 to vehicle wheels 291. Force may be supplied to vehicle wheels via hydraulic or air brakes 290. Hydraulic brake pressure or air pressure applies force to activate brakes 290 and may be observed or measured via brake pressure sensor 234. Brakes 290 may be applied while vehicle 290 is moving, is desired to be held in a stopped state, and as holding or parking brakes. Additionally, hydraulic brakes 290 may be applied when inclinometer 271 indicates a road grade greater than a threshold road grade when vehicle 290 is stopped. Brake system pressure and vehicle incline information may be input to controller 12.

Thus, the system of FIGS. 1 and 2 provides for a vehicle system, comprising: an engine; a brake pedal; and a controller including non-transitory instructions executable to inhibit automatic stopping of the engine in response to a driver applying the brake pedal a plurality of times without fully releasing the brake pedal once the brake pedal is applied during a vehicle stop. The vehicle system includes additional instructions to automatically restart the engine when the engine is stopped in response to the driver applying the brake pedal a plurality of times. The vehicle system further comprises additional instructions to reactivate an engine that is rotating without being supplied fuel in response to the driver applying the brake pedal a plurality of times. The vehicle system includes where applying the brake pedal a plurality of times includes increasing brake fluid pressure by more than a predetermined pressure. The vehicle system includes where applying the brake pedal a plurality of times includes moving the brake pedal more than a predetermined distance. The vehicle system includes where the predetermined distance varies with a distance the brake pedal is applied a first time since the brake pedal is fully released.

Figure 3:
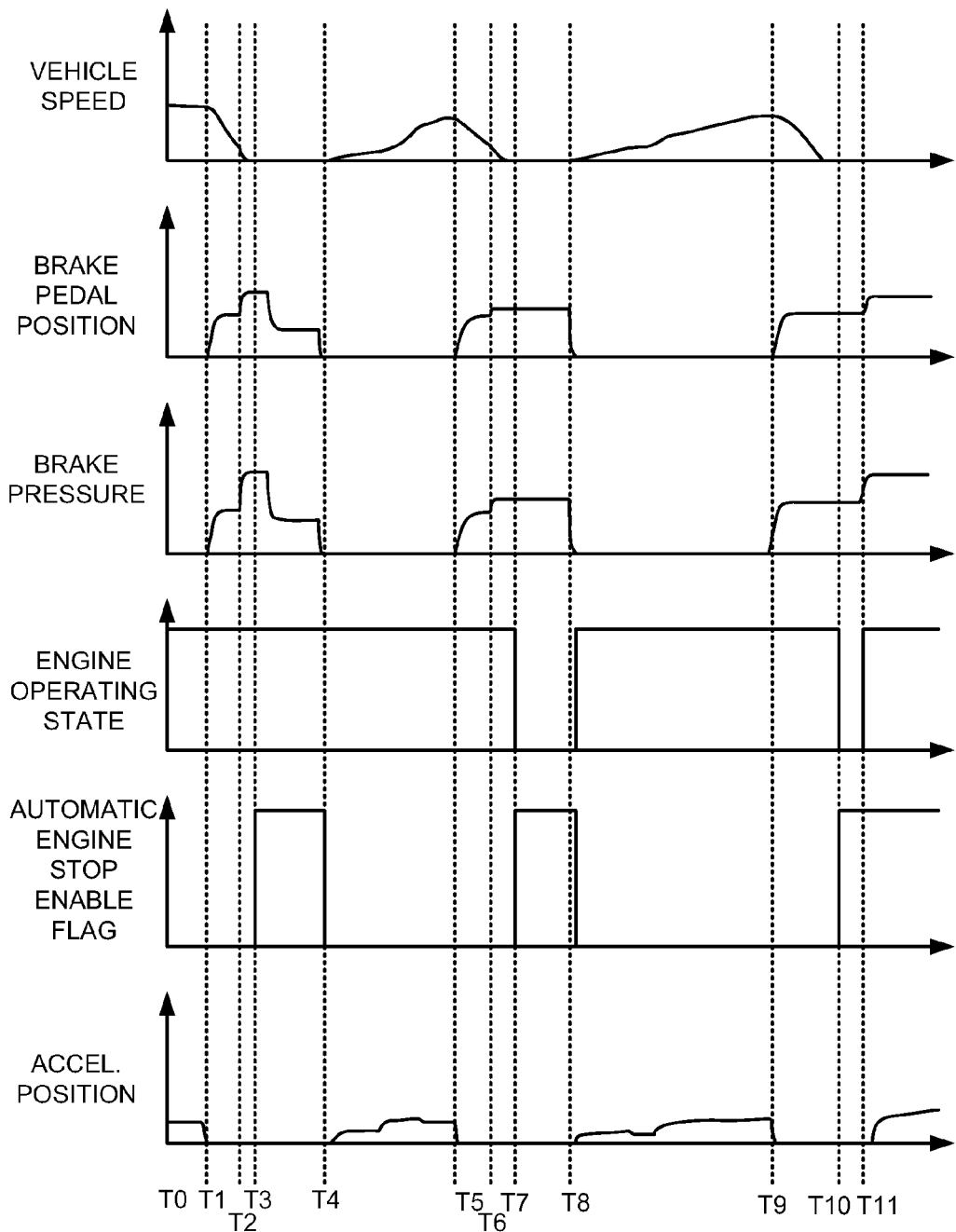
FIG. 3 shows an example prophetic vehicle operating sequence.
Figure 6:
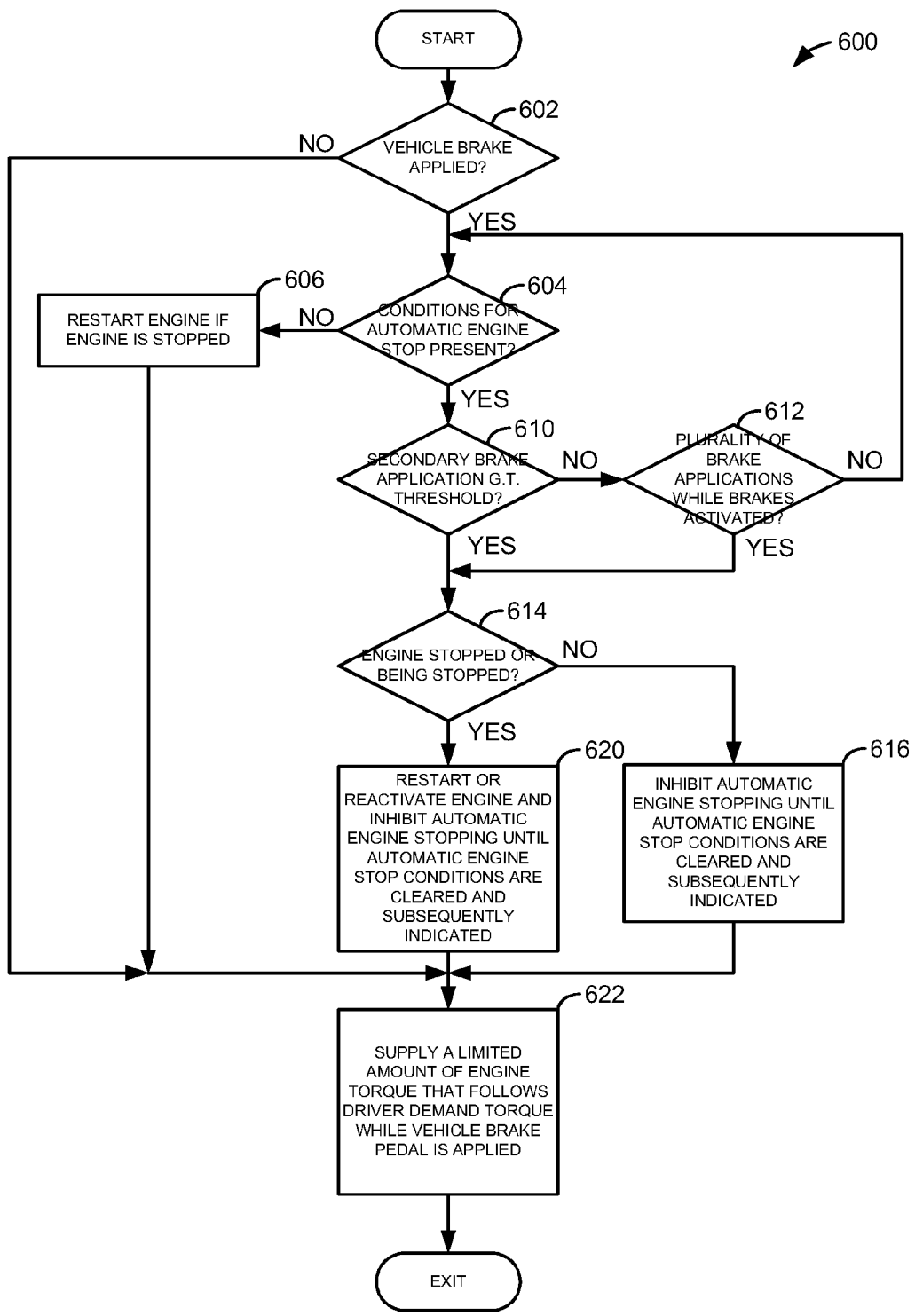
FIG. 6 shows an example method for operating a stop/start engine.

Referring now to FIG. 3, an example prophetic engine operating sequence according to the method of FIG. 6 is shown. Vertical markers T0-T11 represent times of interest during the sequence. Further, the sequence of FIG. 3 may be provided by the system of FIGS. 1 and 2.

The first plot from the top of FIG. 3 is a plot of vehicle speed versus time. The X axis represents time and time increases from the left side of FIG. 3 to the right side of FIG. 3. The Y axis represents vehicle speed and vehicle speed increases in the direction of the Y axis.

The second plot from the top of FIG. 3 is a plot of brake pedal position versus time. The X axis represents time and time increases from the left side of FIG. 3 to the right side of FIG. 3. The Y axis represents brake pedal position and the brake pedal is applied further (e.g., commanding more braking force) in the direction of the Y axis arrow.

The third plot from the top of FIG. 3 is a plot of brake fluid pressure (e.g., hydraulic or air) versus time. The X axis represents time and time increases from the left side of FIG. 3 to the right side of FIG. 3. The Y axis represents brake fluid pressure and brake fluid pressure increases in the direction of the Y axis arrow.

The fourth plot from the top of FIG. 3 is a plot of engine operating state versus time. The X axis represents time and time increases from the left side of FIG. 3 to the right side of FIG. 3. The Y axis represents engine operating state. An engine operating state value of zero represents an engine that is commanded to stop rotation. An engine operating state value of one represents an engine that is commanded to rotate and combust an air-fuel mixture.

The fifth plot from the top of FIG. 3 is a plot of an automatic engine stop enable flag or indicator versus time. The X axis represents time and time increases from the left side of FIG. 3 to the right side of FIG. 3. The Y axis represents a state of an automatic engine stop enable flag or indicator and a value of one indicates that the engine start/stop system is at operating conditions where automatic engine stopping is desired. A value of zero indicates that the engine stop/start system is operating at conditions where automatic engine stopping is not desired. The automatic engine stop enable flag may be set to a value of one when the vehicle is stopped, the vehicle brake pedal is applied, and when the engine is warm to conserve fuel. The automatic engine stop enable flag may be set to a value of one when the vehicle is traveling downhill or decelerating when the driver demand torque is at a low level or during other selected operating conditions. In one example, automatic engine stopping is allowed when the engine is stopped rotating based on vehicle operating conditions without a driver operating a switch or device that has a sole purpose of starting/stopping the engine (e.g., an ignition switch).

The sixth plot from the top of FIG. 3 is a plot of accelerator pedal position versus time. The X axis represents time and time increases from the left side of FIG. 3 to the right side of FIG. 3. The Y axis represents vehicle accelerator pedal position and the accelerator pedal position increases and indicates an increase in driver demand torque in the direction of the Y axis arrow.

At time T0, the vehicle speed is at a middle level and the brake pedal position indicates that the brake is not applied. The brake pressure is at a lower level indicating that no pressure is applied to the vehicle brakes. The engine is operating and rotating and the vehicle is not presently at conditions for automatic engine stopping as indicated by the automatic engine stop enable flag being at a level of zero. The accelerator pedal is at a lower level indicating a lower level driver demand torque.

At time T1, the brake pedal is applied and the brake pedal position increases to indicate that the brake pedal is being applied. The vehicle speed decreases and the brake pressure increases in response to the brake pedal being applied. The engine continues to operate and the automatic engine stop enable flag is not asserted. Additionally, the accelerator pedal is released near time T1 and the accelerator pedal position goes to zero in response to the driver decelerating the vehicle.

At time T2, the driver applies the vehicle brake pedal to a further extent for a second time without fully releasing the brake pedal as indicated by the brake pedal position increasing. The brake pressure also increases as the brake pedal position increases and the vehicle decelerates at a higher rate. The engine continues to operate and the automatic engine stop enable flag is not activated. By increasing the brake pedal position after the brake pedal has been initially applied, the automatic engine stopping may be inhibited or stopped. Alternatively, or in addition, the automatic engine stopping mode may be inhibited or stopped in response to applying the brake pedal a plurality of times without fully releasing the brake pedal. When automatic engine stopping is deactivated, the engine may not be stopped during conditions where the engine would otherwise be automatically stopped.

Additionally, in some examples, method 400 may deactivate automatic engine stopping in response to brake fluid pressure or brake line pressure instead of brake position. For example, if brake pressure increases in response to an applied brake pedal, and if brake pressure increases by a predetermined amount of pressure over the brake pressure when the brake pedal is first applied, automatic engine stopping may be inhibited.

At time T3, vehicle speed is zero, the brake pedal continues to be applied, the brake pressure is at a higher level, and the automatic engine stop enable flag is asserted to indicate that conditions are present to automatically stop the engine. However, the engine is not stopped as indicated by the engine operating state remaining at a higher level to show that the engine is operating. The engine is not stopped even though the automatic engine stop enable flag is activated since the brake pedal or brake pressure has increased by more than a threshold amount after an initial brake application. In other words, application of the vehicle brake and applying more than a threshold amount of pressure to the brakes acts as a signal or condition to bypass or ignore the automatic engine stop enable flag so that the engine is not automatically stopped.

The driver may purposefully apply the vehicle brakes one or more times without fully releasing the vehicle brakes to communicate with the engine controller that the engine is not to be automatically stopped at the present time. The driver may apply the brakes twice or several more times when the driver knows that rapid vehicle acceleration will soon be desired, or during other conditions when the driver wishes to inhibit automatic engine stopping. Consequently, the engine is not stopped at time T3 even though the driver demand torque as indicated by the accelerator pedal position is at a lower level and the vehicle is stopped.

At time T4, the driver releases the brake pedal in response to driving conditions and brake pressure is reduced in response to the released brake pedal. The engine continues to operate and the automatic engine stop enable flag transitions to a low level to indicate that the engine is not to be automatically stopped. The accelerator pedal is applied shortly after the brake pedal is released and the vehicle begins to accelerate. The engine may be automatically stopped after the vehicle begins to accelerate. Alternatively, the engine may be automatically stopped in response to application of the accelerator pedal or other conditions that may be the basis for clearing inhibiting of automatic engine stopping.

Between time T4 and time T5, the vehicle accelerates in response to the released brake pedal and accelerator pedal application. Further, the automatic engine stop enable flag is not asserted and the accelerator pedal is released by the driver near time T5.

At time T5, the driver applies the brake pedal as indicated by the brake pedal position increasing in response to the driver's desired to stop the vehicle. The brake pressure increases in response to the brake pedal being applied and the vehicle slows in response to the vehicle brakes being applied via the brake pedal. The automatic engine stop enable flag remains in a not asserted state and the engine continues to operate as the vehicle decelerates.

At time T6, the vehicle brake is applied to a further extent for a second time. However, the vehicle brake is not applied to an extent where the brake pedal position exceeds a threshold level beyond the position the brake pedal assumed after initial brake pedal application or to an extent that the brake pressure exceeds a threshold level beyond the brake pressure assumed after initial brake pedal application. Consequently, automatic engine stopping is not inhibited. The automatic engine stop flag is not asserted and the engine continues to operate as indicated by the engine operating state.

At time T7, vehicle speed reaches zero speed in response to the accelerator pedal being released and the vehicle brake being applied. Shortly thereafter, the automatic engine stop enable flag is asserted and the engine is stopped as indicated by the engine operating state transitioning to a low level. The accelerator remains not applied and the brake pressure holds the vehicle in a stopped position.

At time T8, the driver releases the vehicle brake pedal in response to vehicle operating conditions as is indicated by the brake pedal position being reduced. The automatic engine stop enable flag transitions to a lower level to indicated the engine is no longer to be automatically stopped. The engine operating state changes to a higher level in response to the automatic engine stop flag transitioning to a lower level and the engine is started by cranking the engine and supplying spark and fuel to the engine. Shortly thereafter, the driver applies the accelerator pedal to accelerate the vehicle. In this way, the automatically stopped engine is restarted.

At time T9, the driver releases the accelerator and shortly thereafter applies the vehicle brake pedal in response to vehicle operating conditions. The brake pressure increases in response to the increase in brake pedal position and the vehicle begins to decelerate as indicated by the vehicle speed decreasing. The automatic engine stop enable flag is not asserted and the engine operating state is at a higher level indicating that the engine is continuing to operate. The brake pedal position and brake pressure remain at steady values shortly after the brake is applied.

Between time T9 and time T10, the vehicle stops in response to the brake pedal being applied and the accelerator pedal not being applied. The engine remains operating and rotating and the automatic engine stop enable flag remains not asserted.

At time T10, the automatic engine stop enable flag transitions to a higher level in response to automatic engine stopping conditions being present. The engine operating state transitions to a higher level to indicate that the engine is commanded to stop rotating in response to the automatic engine stop enable flag being asserted. Thus, the engine is automatically stopped in response to operating conditions. Operating conditions may include but are not limited to vehicle speed equal to zero, time since vehicle stop greater than a threshold time, and vehicle brake being applied.

At time T11, the driver applies the vehicle brake to a greater extent to signal the engine controller that the driver wishes the engine to start. The driver may depress the brake pedal to a further extent to restart the engine based on conditions the driver observes (e.g., traffic lights changing state), or the driver's intent to start the engine for other purposes (e.g., start the engine to keep the cabin heater operating at a higher level). The engine is inhibited or prevented from stopping after the engine is restarted until the vehicle accelerates or another condition occurs.

In these ways, the engine may be automatically restarted and stopped from being automatically stopped in response to a driver applying a brake pedal. In this example, the driver applies the brake pedal to move the brake pedal more than a threshold distance or angle to inhibit automatic engine stopping or to restart the engine. In other examples, the driver may apply the brake pedal a predetermined number of times to inhibit the engine from automatically stopping or to restart a stopped engine.

Figure 4:
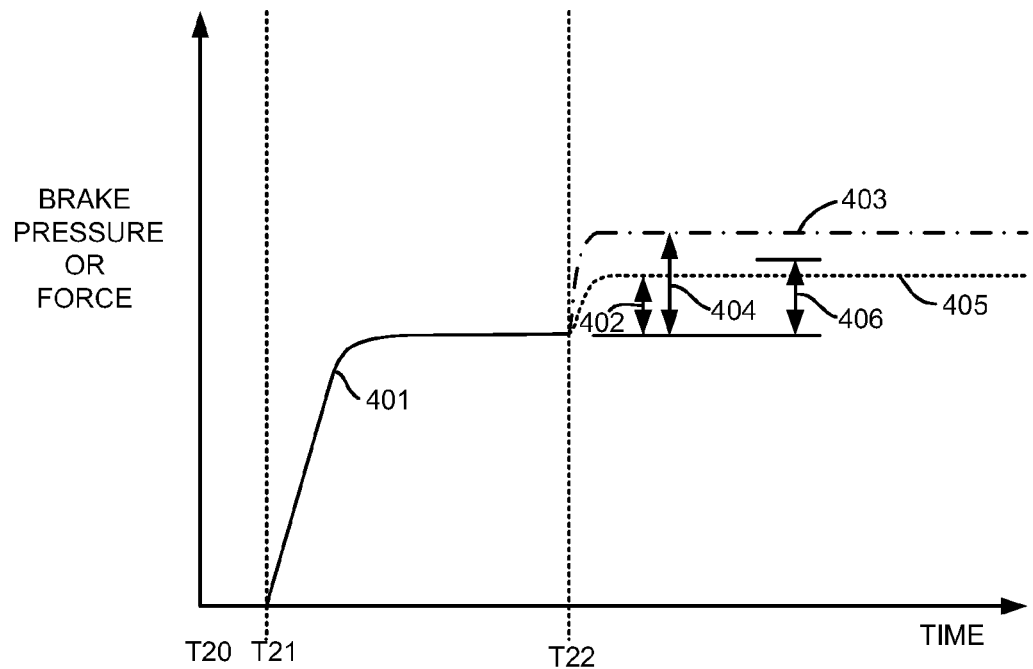
FIGS. 4 and 5 show an example brake pressure and brake position threshold levels.

Referring now to FIG. 4, a plot of a first example of a way to inhibit automatic engine stopping or to activate automatic engine starting in response to brake pressure or force during a braking event is shown. The plot of FIG. 4 includes an X axis that represents time and time increases from the left to right side of FIG. 4. The Y axis represents brake pressure or brake force. Brake pressure may be measured via a pressure sensor or estimated. Line 401 represents brake pressure versus time for initial brake application. Line 403 represents brake pressure versus time for a first example second brake application that provides greater than a threshold brake pressure and that is sufficient to inhibit automatic engine stopping or to initiate starting of an automatically stopped engine. Line 405 represents brake pressure versus time for a second example second brake application that provides less than a threshold brake pressure and that is not sufficient to inhibit automatic engine stopping or to initiate starting of an automatically stopped engine. Lines 405 and 403 may be in a same braking event as line 401, but only one of line 405 and 403 may be present in the same braking event. Lines 405 and 403 are shown together to distinguish between different braking conditions. Vertical lines at T20-T22 represent times of interest during the sequence of FIG. 4.

At time T20, the brake pressure is at a value of zero indicating that the brake pedal is not applied. The driver increases brake pressure at time T21 via applying the vehicle brake pedal. Brake pressure stabilizes at a constant level between time T21 and time T22.

At time T22, the brake pressure in line 403 is shown increasing a second time since time T20 during a second brake application from the level of line 401. The second brake application occurs without the brake being completely released between the first brake application and the second brake application. The brake pressure in line 405 is also shown increasing a second time since time T20 during a second brake application from the level of line 401. A pressure increase from line 401 to line 403 is represented by the length of arrow 404. A pressure increase from line 401 to line 405 is represented by the length of arrow 402. The length of arrow 406 represents a minimum pressure change from the brake pressure of line 401 that may be a condition for inhibit automatic engine stopping or initiating starting of an automatically stopped engine. Thus, arrow 406 represents a threshold pressure to be exceeded in order to inhibit automatic engine stopping or to initiate starting of an automatically stopped engine.

In this way, line 403 shows a brake pressure increase that is greater than the brake pressure of line 405. Consequently, the brake pressure of line 403 relative to the brake pressure of line 401 is sufficient to provide conditions to inhibit automatic engine stopping or to initiate starting of an automatically stopped engine. On the other hand, the brake pressure of line 405 relative to the brake pressure of line 401 is insufficient to provide conditions to inhibit automatic engine stopping or to initiate starting of an automatically stopped engine. The threshold pressure represented by arrow 406 may be adjusted for vehicle operating conditions and based on initial applied brake pressure that is present before a second brake application.

Figure 5:
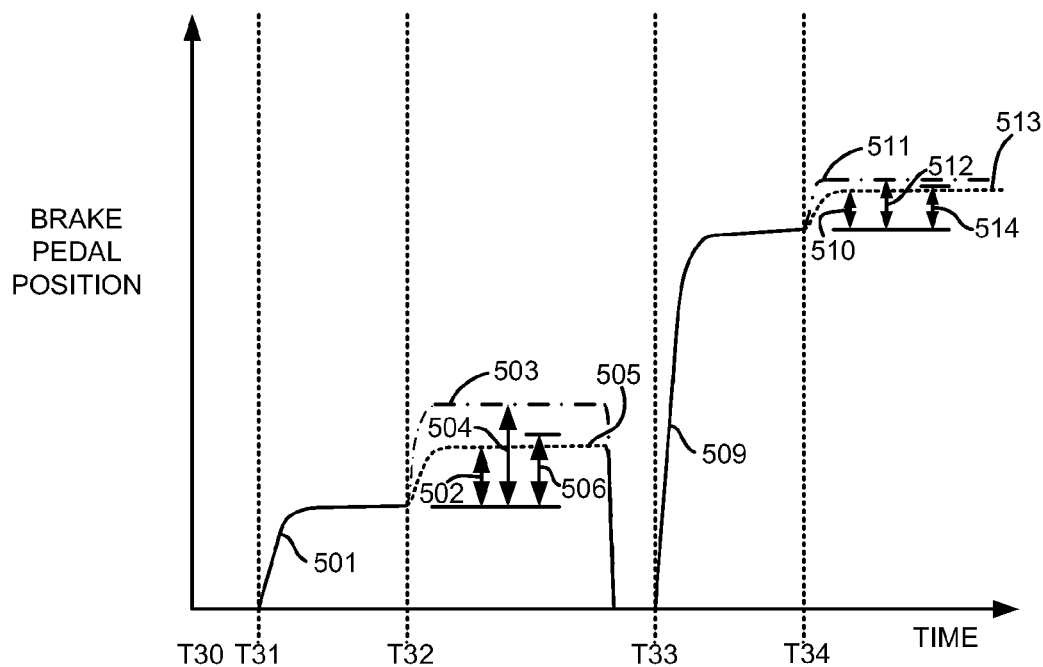

Referring now to FIG. 5, a plot of a first example of a way to inhibit automatic engine stopping or to activate automatic engine starting in response to brake pedal or actuator position is shown. The plot of FIG. 5 includes an X axis that represents time and time increases from the left to right side of FIG. 4. The Y axis represents brake pedal position. Brake pedal position may be measured via a pressure sensor or estimated. Line 501 represents brake pedal position versus time for initial brake application. Line 503 represents brake pedal position versus time for a first example second brake application that provides greater than a threshold brake position increase and that is sufficient to inhibit automatic engine stopping or to initiate starting of an automatically stopped engine. Line 505 represents brake pedal position versus time for a second example second brake application that provides less than a threshold brake position increase and that is not sufficient to inhibit automatic engine stopping or to initiate starting of an automatically stopped engine. Lines 505 and 503 may be in a same braking event as line 501, but only one of line 505 and 503 may be present in the same braking event. Lines 505 and 503 are shown together to distinguish between different conditions. Vertical lines at T30-T34 represent times of interest during the sequence of FIG. 5.

At time T30, the brake position is at a value of zero indicating that the brake pedal is not applied. The driver increases brake position (e.g., applies the brake pedal) at time T31 via applying the vehicle brake pedal. Brake pedal position stabilizes at a constant level between time T31 and time T32.

At time T32, the brake pedal position shown in line 503 increases a second time since time T30 during a second brake application from the level of line 501. The second brake application occurs without the brake pedal being completely released between the first brake application and the second brake application. The brake position shown in line 505 is also shown increasing a second time since time T30 during a second brake application from the level of line 501. A brake pedal position increase from line 501 to line 503 is represented by the length of arrow 504. A brake pedal position increase from line 501 to line 505 is represented by the length of arrow 502. The length of arrow 506 represents a minimum brake pedal position change from the brake position of line 501 that may be a condition for inhibit automatic engine stopping or initiating starting of an automatically stopped engine. Thus, arrow 506 represents a threshold brake pedal position to be exceeded in order to inhibit automatic engine stopping or to initiate starting of an automatically stopped engine.

In this way, line 503 shows a brake pedal position increase that is greater than the brake pedal position increase of line 505. Consequently, the brake pedal position increase of line 503 relative to the brake pedal position of line 501 is sufficient to provide conditions to inhibit automatic engine stopping or to initiate starting of an automatically stopped engine. On the other hand, the brake pedal position increase of line 505 relative to the brake pedal position increase of line 501 is insufficient to provide conditions to inhibit automatic engine stopping or to initiate starting of an automatically stopped engine. The threshold brake pedal position increase represented by arrow 506 may be adjusted for vehicle operating conditions and based on initial applied brake pedal position that is present before a second brake application.

FIG. 5 also shows a second application of the brake pedal beginning at time T33 after the brake pedal is released. In particular, at time T33, the brake pedal is applied and the brake pedal position 509 begins to increase. The brake pedal position stabilizes between time T33 and time T34.

At time T34, the brake pedal position shown in line 509 increases a second time since time T33 during a second brake application from the level of line 509. The second brake application after time T33 occurs without the brake pedal being completely released between the first brake application and the second brake application.

A brake pedal position increase from line 509 to line 513 is represented by the length of arrow 514. A brake pedal position increase from line 509 to line 511 is represented by the length of arrow 512. Lines 511 and 513 represent different brake applications after the brake application of line 509 in a same braking event. Lines 511 and 513 are shown together to distinguish between different braking conditions.

The length of arrow 514 represents a minimum brake pedal position change from the brake position of line 509 that may be a condition for inhibit automatic engine stopping or initiating starting of an automatically stopped engine. Thus, arrow 514 represents a threshold brake pedal position to be exceeded in order to inhibit automatic engine stopping or to initiate starting of an automatically stopped engine.

It may be observed that the change in brake pedal position at time T34 that enables inhibiting automatic engine stopping or initiating starting of an automatically stopped engine requires a shorter or smaller change in brake pedal position than the brake pedal position change at time T32 that inhibits automatic engine stopping or initiating starting of an automatically stopped engine. Thus, different threshold changes in brake pedal position may enable inhibiting automatic engine stopping or initiating starting of an automatically stopped engine at different operating conditions. One reason for allowing a smaller change in brake pedal position to enable automatic engine stopping after a brake pedal has been applied a distance is that the brake pedal force increases as the brake pedal displacement increases. Further, much higher force must be applied to the brake pedal for the brake pedal to move after the brake pedal has been applied to a greater extent as compared to when the brake pedal is applied to a lesser extent. Therefore, in this example, a shorter or smaller change in brake pedal position enables inhibiting automatic engine stopping when the brake pedal has been initially applied to a greater extent. A larger or greater change in brake pedal position enables inhibiting automatic engine stopping when the brake pedal has been initially applied to a lesser extent.

Referring now to FIG. 6, a method for operating a stop/start engine is shown. The method of FIG. 6 may be incorporated in to the system of FIGS. 1 and 2 as executable instructions stored in non-transitory memory. The method of FIG. 6 may provide the operating sequence shown in FIG. 3.

At 602, method 600 judges whether or not the vehicle brake is applied. In one example, the vehicle brake may be determined to be applied based on brake pedal position. In other examples, the vehicle brake may be determined to be applied based on brake line or brake fluid pressure. If method 600 judges that the vehicle brakes are applied, method 600 proceeds to 604. Otherwise, method 600 proceeds to 622.

At 604, method 600 judges whether or not conditions for an automatic engine stop are present. In one example, conditions for an automatic engine stop are present when vehicle speed is less than a threshold speed, the vehicle brakes are applied, and the engine temperature is greater than a threshold temperature. In other examples, conditions for automatic engine stop may be present when vehicle brakes are applied and driver demand torque (e.g., torque demanded by the driver via the accelerator pedal) is less than a threshold amount of torque. If method 600 judges that conditions are present for an automatic engine stop, the answer is yes and method 600 proceeds to 610. Otherwise, the answer is no and method 600 proceeds to 606.

At 606, method 600 restarts the engine if the engine is already stopped rotating. The engine may be restarted via engaging the engine starter, rotating the engine, and supplying spark and fuel to the engine. Method 600 proceeds to 622 after the engine is restarted.

At 610, method 600 judges whether or not a secondary brake application greater than a threshold is present. In one example, a secondary brake application after a first brake application during a same or single braking event of a vehicle deceleration may be determined via monitoring brake pedal position. In other examples, secondary brake application after a first brake application during a vehicle deceleration may be determined via monitoring brake line or brake fluid pressure. Thus, the vehicle driver may communicate with the automatic engine stop/start controller via application of a brake pedal or actuator.

In examples where a secondary brake application is determined via brake pedal position, different brake position change amounts for different initial brake positions may be the basis for determining whether or not a secondary brake application (e.g., where brakes are applied or brake pedal position is increased a second time after brakes are initially applied without the brakes being released) brake position change amount is greater than a threshold amount. For example, as shown in FIG. 5, inhibiting automatic engine stopping or restarting an automatically stopped engine may be performed in response to a change in brake pedal position after a brake pedal is applied to a greater extent (e.g., time after time T34 in FIG. 5) in response to a smaller change in brake pedal position as compared to a change in brake pedal position after the brake pedal is applied to a lesser extent (e.g., time between time T31 and time T33 in FIG. 5).

Similarly, in examples where a secondary brake application is determined via brake pressure or brake force, different brake pressure change amounts for different initial brake application pressures may be the basis for determining whether or not a secondary brake application (e.g., where brakes are applied or brake pedal position is increased a second time after brakes are initially applied without the brakes being released) brake pressure or force change amount is greater than a threshold amount.

If method 600 judges that a secondary brake pedal position or brake force change is greater than a threshold amount, the answer is yes and method 600 proceeds to 614. Otherwise, the answer is no and method 600 proceeds to 612.

At 612, method 600 judges whether or not there have been a plurality of brake applications after the initial brake application in a same or single braking event without the vehicle brakes being released. For example, method 600 may judge whether the brake pedal has been applied and partially released twice to indicate the driver's intent to inhibit automatic engine stopping or to automatically restart an automatically stopped engine. Similarly, method 600 may judge whether or not the brake line or brake fluid pressure has increased and subsequently decreased to a value greater than zero a predetermined number of times to indicate the driver's intent to inhibit automatic engine stopping or to automatically restart an automatically stopped engine. If method 600 judges that a plurality of brake applications (e.g., increasing brake force) have occurred while the vehicle brakes are activated, the answer is yes and method 600 proceeds to 614. Otherwise, the answer is no and method 600 returns to 604.

It should be noted that the engine may be automatically stopped while portions of the method of FIG. 6 are executing. The engine may be automatically stopped based on conditions such as vehicle speed, brake pedal application, and absence of driver demand torque.

At 614, method 600 judges whether or not the engine is stopped or being stopped. The engine may determined to be stopped when engine rotational speed is zero. The engine may be determined to be being stopped if spark and/or fuel supplied to the engine is deactivated while the engine continues to rotate. If method 600 determines that the engine is stopped or being stopped, the answer is yes and method 600 proceeds to 620. Otherwise, the answer is no and method 600 proceeds to 616.

At 616, method 600 inhibits or stops automatic engine stopping until automatic engine stop conditions are cleared or not present and subsequently are indicated and present. For example, automatic engine stopping may not be allowed after the brake pedal is applied a second time after an initial brake application and until the vehicle moves and later reaches zero speed. In another example, automatic engine stopping may not be allowed after a brake pedal is applied three times without releasing the vehicle brake until the vehicle brake is fully released and subsequently applied three times without the brake pedal being released.

Inhibiting automatic engine stopping causes the engine to continue to combust air-fuel mixtures even though conditions are present for automatic engine stopping. Consequently, the engine does not have to be restarted to accelerate the vehicle or to provide power to vehicle accessories. Method 600 proceeds to 622 after automatic engine stopping is inhibited.

At 620, method 600 restarts or reactivates a rotating engine and inhibits automatic engine stopping until automatic engine stopping conditions are cleared or not present and are subsequently present. For example, if engine speed is zero, the engine is cranked and restarted by supplying spark and fuel to the engine. The engine may not be automatically stopped until automatic engine stopping conditions are present after automatic engine starting conditions have been cleared. In another example, the engine may inhibited from automatically stopping until the vehicle speed has increased to a value greater than zero and returned to a value of zero. In yet another example, spark and/or fuel may be supplied to an engine that is rotating to reactivate the engine and combust air-fuel mixtures in the engine. The reactivated engine may not be automatically stopped until automatic engine stopping conditions are not present and are subsequently present. In this way, a deactivated decelerating engine may be restarted in response to a driver applying a brake pedal. Method 600 proceeds to 622 after the engine is restarted or reactivated.

At 622, method 600 supplies a limited amount of engine torque in response to a driver demand torque while the vehicle brakes are applied. For example, if the driver is applying vehicle brakes and requesting 75 N-m of torque, method 600 may supply 30 N-m of torque. If the driver is not applying the vehicle brakes, the engine output torque follows the driver demand torque. Engine torque is adjusted via adjusting engine spark, air amount, and fuel amount based on the driver demand torque and engine torque limits. Method 600 proceeds to exit after engine torque is adjusted.

Thus, the method of FIG. 6 provides for a method for operating an engine, comprising: inhibiting automatic engine stopping in response to a secondary application of vehicle brakes following an initial application of vehicle brakes, the secondary application of vehicle brakes occurring after the initial application of vehicle brakes and without vehicle brakes being fully released. The method includes where inhibiting automatic engine stopping causes the engine to continue combusting air and fuel mixtures during conditions where automatic engine stopping is otherwise allowed. The method includes where the secondary application of vehicle brakes following the initial application of vehicle brakes includes changing a brake pedal position by more than a threshold amount.

In another example, the method further comprises not inhibiting automatic engine stopping when changing the brake pedal position by less than the threshold amount. The method further comprises inhibiting automatic engine stopping in response to a plurality of brake applications of vehicle brakes while the vehicle brakes are activated. The method includes where the plurality of brake applications comprises depressing a brake pedal a plurality of times. The method also includes where vehicle brakes are fully released when the brake pedal is fully released.

The method of FIG. 6 also includes a method for operating an engine, comprising: inhibiting automatic engine stopping in response to a secondary application of vehicle brakes following an initial application of vehicle brakes, the secondary application of vehicle brakes occurring after the initial application of vehicle brakes and without vehicle brakes being fully released; and automatically restarting the engine in response to the secondary application of vehicle brakes. The method includes where the engine is restarted without engaging a starter while the engine is rotating. The method includes where the engine is automatically restarted from an engine stop.

In some examples, the method further comprises inhibiting automatic engine stopping until automatic engine stopping conditions are not present. The method further comprises inhibiting automatic engine stopping until a vehicle in which the engine operates moves and stops after inhibiting automatic engine stopping. The method includes where the secondary application of vehicle brakes includes moving a brake pedal is greater than a threshold distance. The method includes where the secondary application of vehicle brakes includes increasing brake fluid pressure greater than a threshold brake pressure amount. The method also includes where the brake pedal is required to move a predetermined distance that varies with a distance the brake pedal is applied a first time since the brake pedal is fully released to inhibit automatic engine stopping.

As will be appreciated by one of ordinary skill in the art, method described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the described actions, operations, methods, and/or functions may graphically represent code to be programmed into non-transitory memory of the computer readable storage medium in the engine control system.

This concludes the description. The reading of it by those skilled in the art would bring to mind many alterations and modifications without departing from the spirit and the scope of the description. For example, 13, 14, 15, V6, V8, V10, and V12 engines operating in natural gas, gasoline, diesel, or alternative fuel configurations could use the present description to advantage.

The invention claimed is:

1. A method for operating an engine, comprising:
inhibiting automatic engine stopping in response to a secondary application of vehicle brakes following an initial application of vehicle brakes, the secondary application of vehicle brakes occurring after the initial application of vehicle brakes and without vehicle brakes being fully released.

2. The method of claim 1, where inhibiting automatic engine stopping causes the engine to continue combusting air and fuel mixtures during conditions where automatic engine stopping is otherwise allowed.

3. The method of claim 1, where the secondary application of vehicle brakes following the initial application of vehicle brakes includes changing a brake pedal position by more than a threshold amount.

4. The method of claim 3, further comprising not inhibiting automatic engine stopping when changing the brake pedal position by less than the threshold amount.

5. The method of claim 1, further comprising inhibiting automatic engine stopping in response to a plurality of brake applications of vehicle brakes while the vehicle brakes are activated.

6. The method of claim 5, where the plurality of brake applications comprises depressing a brake pedal a plurality of times.

7. The method of claim 1, where vehicle brakes are fully released when the brake pedal is fully released.

8. A method for operating an engine, comprising:
inhibiting automatic engine stopping in response to a secondary application of vehicle brakes following an initial application of vehicle brakes, the secondary application of vehicle brakes occurring after the initial application of vehicle brakes and without vehicle brakes being fully released; and
automatically restarting the engine in response to the secondary application of vehicle brakes.

9. The method of claim 8, where the engine is restarted without engaging a starter while the engine is rotating.

10. The method of claim 8, where the engine is automatically restarted from an engine stop.

11. The method of claim 8, further comprising inhibiting automatic engine stopping until automatic engine stopping conditions are not present.

12. The method of claim 8, further comprising inhibiting automatic engine stopping until a vehicle in which the engine operates moves and stops after inhibiting automatic engine stopping.

13. The method of claim 8, where the secondary application of vehicle brakes includes moving a brake pedal is greater than a threshold distance.

14. The method of claim 8, where the secondary application of vehicle brakes includes increasing brake fluid pressure greater than a threshold brake pressure amount.

15. A vehicle system, comprising:
an engine;
a brake pedal; and
a controller including non-transitory instructions executable to inhibit automatic stopping of the engine in response to a driver applying the brake pedal a plurality of times without fully releasing the brake pedal once the brake pedal is applied during a vehicle stop.

16. The vehicle system of claim 15, including additional instructions to automatically restart the engine when the engine is stopped in response to the driver applying the brake pedal a plurality of times.

17. The vehicle system of claim 15, further comprising additional instructions to reactivate an engine that is rotating without being supplied fuel in response to the driver applying the brake pedal a plurality of times.

18. The vehicle system of claim 17, where applying the brake pedal a plurality of times includes increasing brake fluid pressure by more than a predetermined pressure.

19. The vehicle system of claim 15, where applying the brake pedal a plurality of times includes moving the brake pedal more than a predetermined distance.

20. The vehicle system of claim 19, where the predetermined distance varies with a distance the brake pedal is applied a first time since the brake pedal is fully released.

\* \* \* \* \*